United States Patent [19]
Wisor et al.

[11] Patent Number: 5,671,424
[45] Date of Patent: Sep. 23, 1997

[54] IMMEDIATE SYSTEM MANAGEMENT INTERRUPT SOURCE WITH ASSOCIATED REASON REGISTER

[75] Inventors: Michael T. Wisor; Rita M. O'Brien, both of Austin, Tex.

[73] Assignee: Advanced Micro Devices, Inc., Sunnyvale, Calif.

[21] Appl. No.: 190,285

[22] Filed: Feb. 2, 1994

[51] Int. Cl.$^6$ .................................................. G06F 9/46
[52] U.S. Cl. ..................................... 395/742; 395/733
[58] Field of Search .............................. 395/725, 325, 395/275, 575, 500, 733, 742

[56] References Cited

U.S. PATENT DOCUMENTS

| | | | |
|---|---|---|---|
| 4,315,314 | 2/1982 | Russo | 395/725 |
| 4,349,873 | 9/1982 | Gunter et al. | 395/742 |
| 4,420,806 | 12/1983 | Johnson, Jr. et al. | 395/725 |
| 4,573,118 | 2/1986 | Damouny et al. | 395/775 |
| 4,779,195 | 10/1988 | James | 395/275 |
| 5,274,825 | 12/1993 | Lemay et al. | 395/725 |
| 5,291,608 | 3/1994 | Flurry | 395/725 |
| 5,357,628 | 10/1994 | Yuen | 395/575 |
| 5,392,420 | 2/1995 | Balmer et al. | 395/500 |
| 5,404,457 | 4/1995 | Gephardt et al. | 395/325 |
| 5,410,710 | 4/1995 | Sarangdhar et al. | 395/725 |

*Primary Examiner*—Jack B. Harvey
*Assistant Examiner*—David A. Wiley
*Attorney, Agent, or Firm*—Conley, Rose & Tayon, P.C.; B. Noel Kivlin

[57] ABSTRACT

A power management unit that includes a software writable enable register for receiving an SMI enable bit when the generation of an immediate SMI is desired. When the enable bit is set, an SMI flag register causes the assertion of an SMI signal. The power management unit further includes a reason register that is also writable via software command. The reason register is written prior to the setup of the enable bit with a "reason value" indicative of the reason a pending SMI is being requested. The immediate system management interrupt source allows initiating software to indicate the reason it is requesting an SMI, and causes an associated SMI to be asserted with minimal latency. The immediate system management interrupt source further allows the system management interrupt service routine to quickly determine the reason for the immediate SMI, thereby allowing simplified and more efficient SMI service routines and further allowing greater flexibility in programming. As a result, overall performance of the computer system may be improved.

17 Claims, 3 Drawing Sheets

IMMEDIATE SYSTEM MANAGEMENT INTERRUPT SOURCE WITH ASSOCIATED REASON REGISTER

BACKGROUND OF THE INVENTION

1. Field of the Invention

This invention relates to computer systems and more particularly to system management interrupt sources employed within computer systems.

2. Description of the Relevant Art

Interrupt-driven computer systems provide a mechanism that allows a hardware signal to force the software to change its path of execution. The first step a microprocessor takes to process an interrupt is to save the program counter (usually on the stack, an area of memory pointed to by the microprocessor's stack pointer that operates in a last-in-first-out fashion). This allows the software to return to normal program flow at the point at which it was interrupted by loading the saved value from the stack into the microprocessor's program counter. Some microprocessors automatically save other registers (such as the accumulator or index pointer) in addition to the program counter. The actual interrupt processing begins when the microprocessor jumps to the interrupt service routine. The interrupt service routine is a subset of software code that services the interrupt.

If the microprocessor hardware cannot distinguish between various interrupt sources, then the interrupts are called non-vectored. For non-vectored interrupts, the interrupt service routine must test (poll) each of the possible interrupt sources to determine which device generated the interrupt. A faster scheme involves vectored interrupts, which allow an interrupting device to identify itself by driving an ID code on the data bus during an interrupt acknowledge cycle at the beginning of the interrupt processing. The microprocessor then executes the indicated interrupt service routine.

Microprocessors such as the particularly popular models 80386 and 80486 microprocessors include an input terminal (INT) for receiving an interrupt signal. Computer systems that include multiple interrupting devices frequently employ programmable interrupt controllers that allow software prioritizing and masking of the various interrupt sources. Exemplary interrupt sources include keyboards, printers, and real time clocks.

Most microprocessors also employ a non-maskable interrupt (NMI) which cannot be disabled by software. This interrupt is usually processed at the end of the current instruction execution. It is typically used for relatively high-priority error interrupts, such as an abort signal or power-failure detection.

Yet another type of interrupt is a system management interrupt (SMI). A system management interrupt is typically treated with a higher priority than both non-maskable interrupts and standard interrupts. System management interrupts are used to initiate and/or maintain various system management functions, such as, for example, power management.

One problem associated with a typical computer system is the latency associated with the generation of SMI signals. For example, although power management units within typical computer systems allow the scheduling of SMI's via software, the SMI response is not immediate and typically has a latency of several microseconds or even milliseconds. In addition, the software that initiated the SMI is usually treated independently of the SMI service routine. Thus, the reason the SMI was initiated may not be available to the SMI service routine, or somewhat elaborate software techniques must be used to determine the reason the SMI was initiated. As a result, system software may be restricted and the overall performance of the computer system may be degraded.

SUMMARY OF THE INVENTION

The problems outlined above are in large part solved by an immediate system management interrupt source with associated reason register in accordance with the present invention. In one embodiment, a power management unit is provided that includes a software writable enable register for receiving an SMI enable bit when the generation of an immediate SMI is desired. When the enable bit is set, an SMI flag register causes the assertion of an SMI signal. The power management unit further includes a reason register that is also writable via software command. The reason register is written prior to the setting of the enable bit with a "reason value" indicative of the reason a pending SMI is being requested. The immediate system management interrupt source allows initiating software to indicate the reason it is requesting an SMI, and causes an associated SMI to be asserted with minimal latency. The immediate system management interrupt source further allows the system management interrupt service routine to quickly determine the reason for the immediate SMI, thereby allowing simplified and more efficient SMI service routines and further allowing greater flexibility in programming. As a result, overall performance of the computer system may be improved.

Broadly speaking, the present invention contempates a computer system comprising a microprocessor having a system management interrupt input and an enable register coupled to the microprocessor. The enable register is capable of storing an enable bit written by the microprocessor. A predetermined bit of a flag register is set in response to writing the enable bit into the enable register, and a system management interrupt signal is asserted at the system management interrupt input of the microprocessor when the predetermined bit of the flag register is set. A reason register is further provided coupled to the microprocessor, wherein a reason value is capable of being written into the reason register, and wherein the reason value is indicative of the reason the system management interrupt signal is being asserted.

The present invention further contemplates a method for generating and processing a system management interrupt comprising the steps of storing a reason value within a reason register, wherein the reason value is indicative of a pending system management interrupt, loading an enable bit within an enable register, and setting a bit of a flag register in response to the enable bit. The method further comprises the steps of asserting a system management interrupt in response to the setting of the bit of the flag register, providing the system management interrupt to a microprocessor, and reading the reason value within the reason register. The method finally comprises the step of servicing the system management interrupt with dependence upon the reason value.

The present invention finally contemplates a method for generating and processing system management interrupts within a computer system comprising the steps of storing a reason value within a reason register, wherein the reason value is indicative of a reason a subsequent system management interrupt is being asserted, loading an enable bit within an enable register, and setting a bit of a flag register in response to the enable bit. The method further comprises the steps of asserting a first system management interrupt in response to the setting of the bit of the flag register, providing the system management interrupt to a microprocessor, and reading the reason value within the reason register. The method finally comprises the step of servicing the system management interrupt with dependence upon the reason value.

BRIEF DESCRIPTION OF THE DRAWINGS

Other objects and advantages of the invention will become apparent upon reading the following detailed description and upon reference to the accompanying drawings in which.

Figure 1:
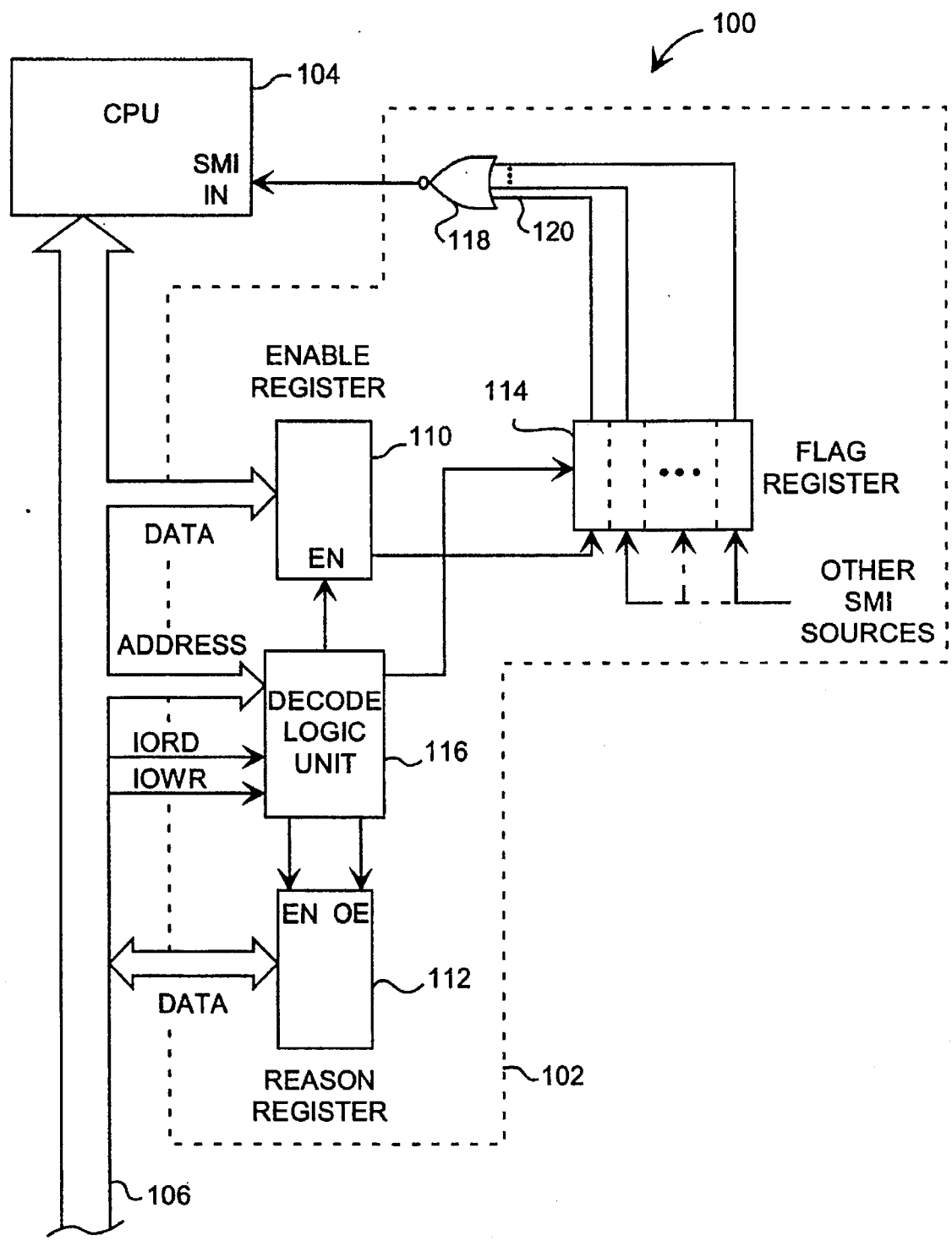
FIG. 1 is a block diagram of a computer system including an immediate system management interrupt source with an associated reason register according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system 100 including an immediate system management interrupt (SMI) source 102 according to the present invention. Computer system 100 further includes a microprocessor (CPU) 104 coupled to immediate SMI source 102 via a bus 106.

Microprocessor 104 is a data processing unit that implements a predetermined instruction set and that includes a system management interrupt input (SMI IN) terminal. Microprocessor 104 is illustrative of, for example, a model 80486 microprocessor.

Immediate SMI source 102 includes an enable register 110, a reason register 112, and a flag register 114 coupled to a decode logic unit 116. Flag register 114 is coupled to the SMI input terminal of microprocessor 104 through a NOR gate 118.

If the programmer of computer system 100 desires that an SMI be generated at a particular point within the execution code, the programmer first loads a "reason value" indicative of the reason the SMI is being requested into reason register 112. For example, the programmer may define a reason value of "2a" (hexadecimal) to indicate that a specific power management function, such as updating an estimated value of a battery capacity, should be carried out in response to the SMI. Since reason register 112 is mapped within the I/O addressable space of computer system 100, the reason value is written into reason register 112 by the microprocessor 104 through the execution of an I/O write cycle. When an appropriates I/O write cycle is executed, decode logic unit 116 decodes the addressing signal and responsively causes the reason value to be latched into reason register 112.

Subsequently (or concurrently), the programmer may set an enable bit within enable register 110. The enable register 110 is also mapped within the I/O addressable space of computer system 100, and thus the enable bit is set within enable register 110 by executing an appropriate I/O write cycle on bus 106. In response to such an I/O write cycle, decode logic unit 116 decodes the addressing signal on bus 106 and generates a latching signal to latch the enable bit into enable register 110. When the enable bit is stored within enable register 110, a corresponding bit is set within flag register 114. Accordingly, an input line 120 of NOR gate 118 is driven high, causing the SMI IN terminal of microprocessor 104 to be driven low.

Figure 2:
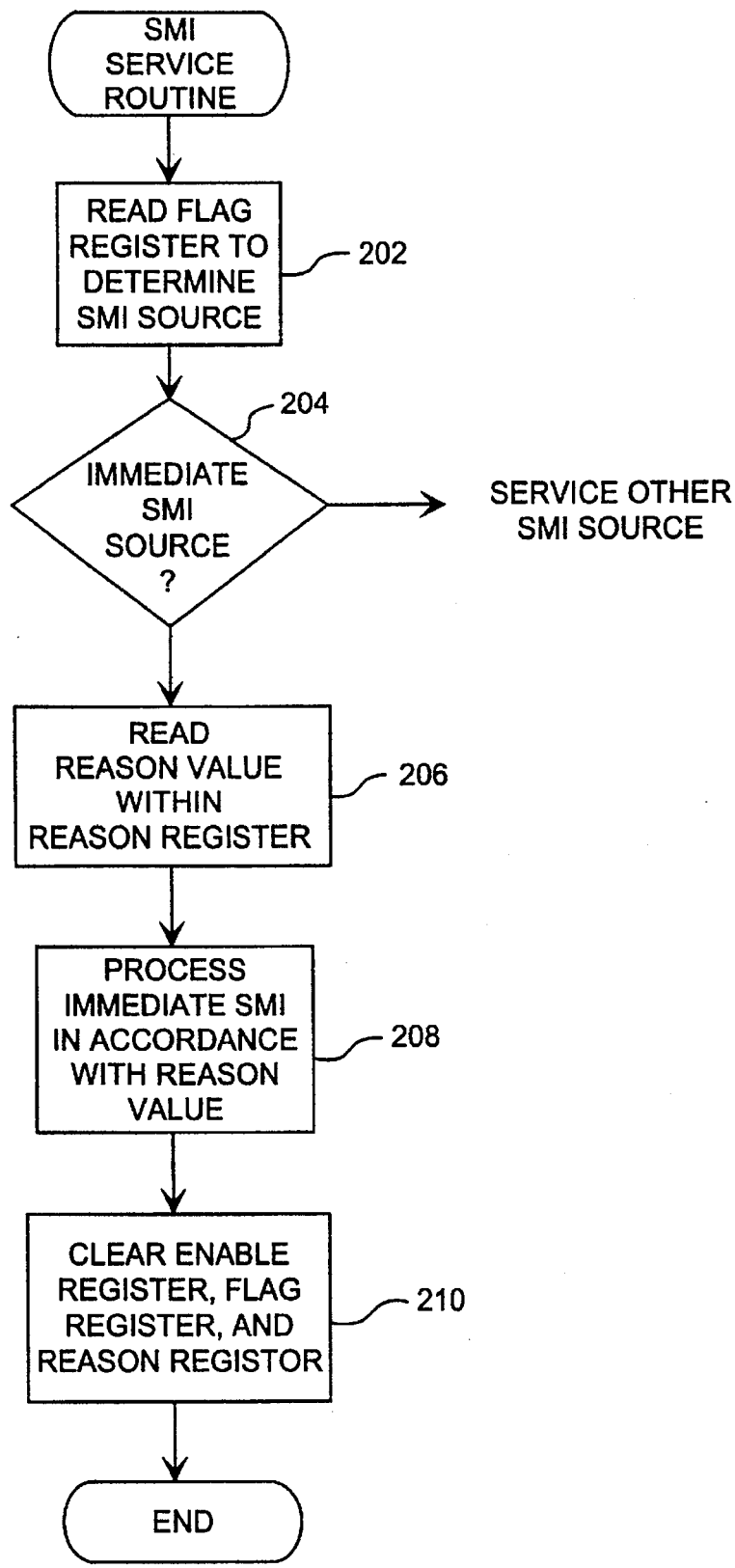
FIG. 2 is a flow diagram that illustrates the steps carried out by a system management interrupt service routine in response to an asserted SMI signal by the immediate system management interrupt source of FIG. 1.

When the SMI IN terminal of microprocessor 104 is driven low, the microprocessor completes its current instruction and jumps to a predetermined memory location that contains the starting instruction of the SMI source routine. FIG. 2 is a flow diagram that illustrates the steps carried out by the SMI service routine. During step 202, the SMI service routine first reads the status of flag register 114 to determine the SMI source that initiated the interrupt. It is noted that flag register 114 includes a tri-stated output port coupled to bus 106 that allows the flag register status to be read.

If the SMI signal was asserted in response to an SMI source other than the immediate SMI source 102 as determined during step 204, the SMI service routine jumps to the code that services the particular source. On the other hand, if the source of the interrupt signal is determined to be the immediate SMI source 102, the SMI service routine reads the status of reason register 112. At this point, the reason value stored within reason register 112 is provided to the SMI service routine. Subsequently, the reason value may be used to control the processing of the SMI. After the system management interrupt has been serviced, the enable register 110, the reason register 112, and the flag register 114 are cleared. This completes the SMI execution of the service routine.

In accordance with the computer system 100 depicted in FIG. 1, an immediate SMI source is provided that allows system software to initiate an SMI. The generation of the SMI occurs within a few gate delays following the write of an enable bit to the enable register 110. Since the immediate SMI source includes a reason register, software can indicate the reason for the requested SMI prior to its generation, and the SMI service routine can subsequently read the reason register to determine the subsequent processing and path of execution. Accordingly, the immediate SMI source of FIG. 1 allows simplified and more flexible programming capability, and may improve overall system performance.

It is noted that for the embodiment of FIG. 1, the enable register 110 is a one bit register. The enable register 110 and reason register 112 could alternatively be implemented using a single register having a predetermined bit dedicated as the enable bit. The remaining bits store data indicative of the reason for the particular SMI.

In one embodiment, the reason register stores an 8-bit reason value that allows for up to 255 immediate SMI reason variations. It is noted that the reason register value of 00(hex) may be used to indicate "no reason ". It is further noted that the 8-bit reason value may be loaded into reason register 112 before or concurrently with the setting of the enable bit within enable register 110.

Figure 3:
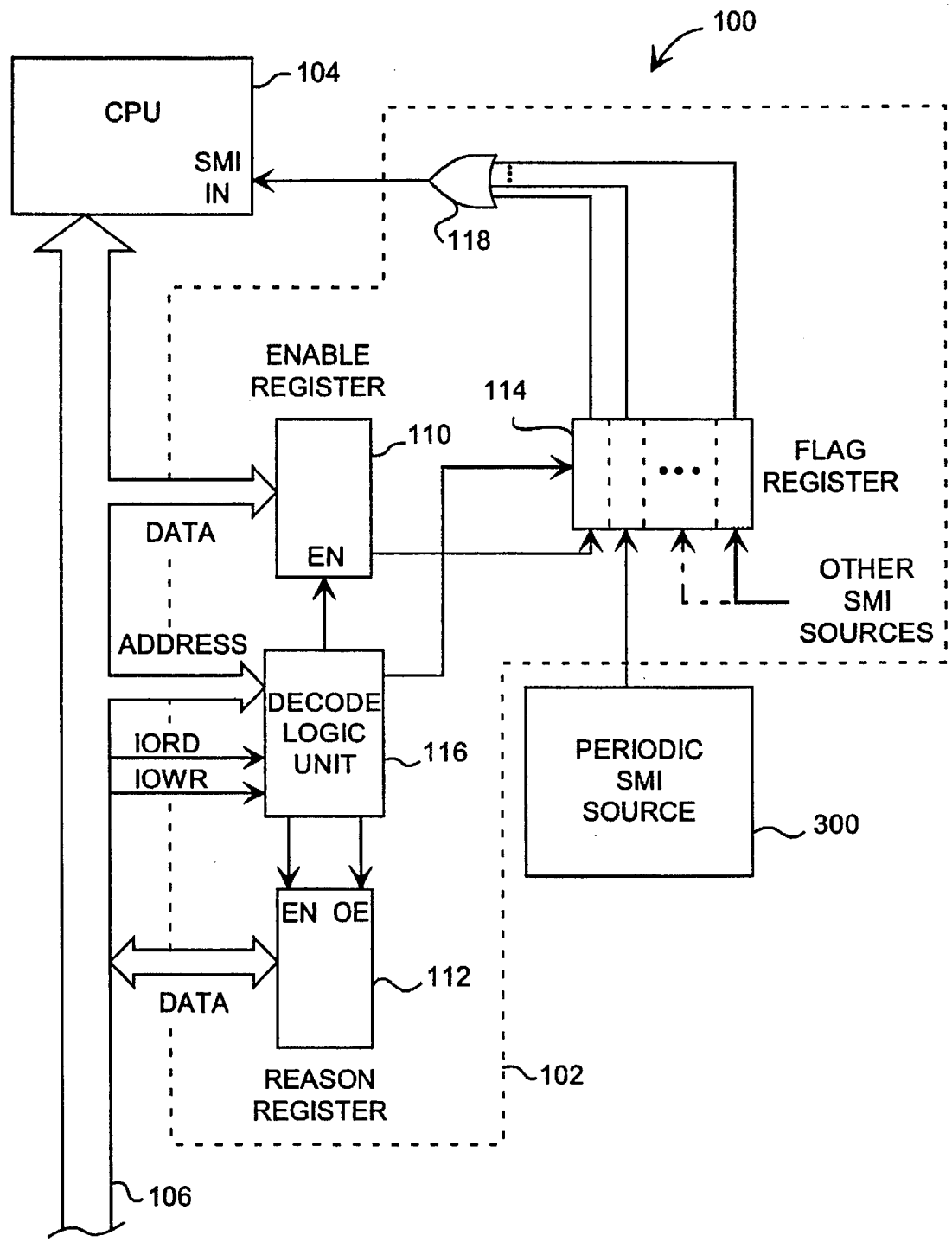
FIG. 3 is a block diagram of a computer system including an immediate system management interrupt source and a periodic system management interrupt source according to the present invention.

FIG. 3 illustrates a block diagram of a computer system 100 including immediate SMI source 102 and a periodic SMI source 300. The periodic SMI source 300 is provided to automatically generate an SMI at a predetermined, programmable rate. An exemplary periodic SMI source 300 is described in the copending, commonly assigned patent application entitled "Periodic System Management Interrupt Source and Power Management System Employing the Same", by Wisor, et al., Ser. No. 08/190,597, now U.S. Pat. No. 5,606,713 filed concurrently herewith. This patent application is incorporated herein by reference in its entirety.

In the embodiment of FIG. 3, the immediate SMI source 102 and periodic SMI source 300 are incorporated within a power management unit of a computer system to allow flexible and versatile use of system management interrupts for power management purposes.

It is noted that the immediate system management interrupt source described above may be used within a computer system that employs the circuits and techniques described within the copending, commonly assigned patent applications: "Power Management Message Bus for Integrated Processor", by Gephardt, et al., Ser. No. 08,190,280, filed concurrently herewith; "Power Management System for an Integrated Processor", by O'Brien , et al., Ser. No. 08,190, 292, now U.S. Pat. No. 5,111,203 filed concurrently herewith; and "Power Management Unit Including Software Configurable State Register and Time-Out Counters for Protecting Against Misbehaved Software", by O'Brien, et al., Ser. No. 08/190,279, now U.S. Pat. No. 5,504,910, filed concurrently herewith. The above copending, commonly assigned patent applications are incorporated herein by reference in their entirety.

Numerous variations and modifications will become apparent to those skilled in the art once the above disclosure is fully appreciated. For example, although bus 106 of FIG. 1 is a CPU local bus, bus 106 could alternatively be coupled to microprocessor 104 via a secondary bus and a bus bridge. It is intended that the following claims be interpreted to embrace all such variations and modifications.

What is claimed is:

1. A computer system comprising:
    a microprocessor including a non vectored system management interrupt input;
    an enable register coupled to said microprocessor, wherein said enable register is configured to store an enable bit written by said microprocessor;
    a flag register coupled to said enable register, wherein a predetermined bit of said flag register is set in response to the writing of said enable bit into said enable register, and wherein a system management interrupt signal is asserted at said system management interrupt input of said microprocessor when said predetermined bit of said flag register is set; and
    a reason register coupled to said microprocessor, wherein a reason value is written into said reason register, and wherein said assertion of said system management interrupt signal invokes an interrupt service routine at a predetermined location, and wherein said interrupt service routine reads said reason value within said reason register and performs a specific function with dependence on said reason value.

2. The computer system as recited in claim 1 further comprising a decode logic unit coupled to said enable register and said reason register for decoding an address signal generated by said microprocessor.

3. The computer system as recited in claim 2 wherein said decode logic unit is
    configured to provide a latching signal to said reason register in response to an I/O write cycle executed by said microprocessor.

4. The computer system as recited in claim 1 wherein said flag register further includes a plurality of additional bits for setting SMI requests from other SMI sources.

5. The computer system as recited in claim 1 further comprising a periodic system management interrupt source coupled to said flag register.

6. The computer system as recited in claim 5 wherein said periodic system management interrupt source is programmable and asserts an SMI request signal at a predetermined periodic rate.

7. A method for generating and processing system management interrupts comprising the steps of:
    storing a reason value within a reason register, wherein said reason value is programmable by a user, and wherein said reason value is indicative of a pending system management interrupt;
    loading an enable bit within an enable register;
    setting a bit of a flag register in response to said enable bit;
    asserting a first non-vectored system management interrupt in response to the setting of said bit of said flag register;
    providing said non-vectored system management interrupt to a microprocessor;
    invoking an interrupt service at a predetermined location in response to said system management interrupt;
    reading said reason value within said reason register; and
    performing a specific function within said interrupt service routine with dependence upon said reason value.

8. The method for generating and processing a system management interrupt as recited in claim 7 wherein said steps of storing a reason value within a reason register and loading an enable bit within an enable register are performed simultaneously.

9. The method for generating and processing a system management interrupt as recited in claim 7 wherein said step of storing a reason value within a reason register is performed before said step of loading an enable bit within an enable register.

10. The method for generating and processing a system management interrupt as recited in claim 7 comprising the further of reading a status of said flag register to determined a source of said system management interrupt.

11. The method for generating and processing a system management interrupt as recited in claim 10 wherein said step of reading said status of said flag register is performed before said step of reading said reason value stored within said reason register.

12. A method for generating and processing system management interrupts within a computer system comprising the steps of:
    storing a reason value within a reason register, wherein said reason value is programmable by a user, and wherein said reason value is indicative of a reason a subsequent system management interrupt is being asserted;
    loading an enable bit within an enable register;
    setting a bit of a flag register in response to said enable bit;
    asserting a first non-vectored system management interrupt in response to the setting of said bit of said flag register;
    providing said non-vectored system management interrupt to a microprocessor;
    invoking an interrupt service routine at a predetermined location in response to said system management interrupt;

reading said reason value within said reason register; and performing a specific function within said interrupt service routine with dependence upon said reason value.

13. The method for generating and processing system management interrupts as recited in claim 12 comprising the further step of generating a periodic system management interrupt at a predetermined rate.

14. The method for generating and processing system management interrupts as recited in claim 13 comprising the further step of providing said periodic system management interrupt to said microprocessor.

15. The method for generating and processing system management interrupts as recited in claim 13 wherein said periodic system management interrupt is generated by a periodic system management interrupt source.

16. The method for generating and processing system management interrupts as recited in claim 15 comprising the further step of programming said periodic system management interrupt source with a value that sets said predetermined rate.

17. The method for generating and processing system management interrupts as recited in claim 13 comprising the further step of setting a second bit of said flag register in response to an assertion of said periodic system management interrupt.

* * * * *

UNITED STATES PATENT AND TRADEMARK OFFICE
CERTIFICATE OF CORRECTION

PATENT NO. : 5,671,424

DATED : September 23, 1997

INVENTOR(S) : Michael T. Wisor; Rita M. O'Brien

It is certified that error appears in the above-identified patent and that said Letters Patent is hereby corrected as shown below:

In the Claims:

Claim 7, col. 6, line 11, please insert the word "a" before the word "system".

Claim 7, col. 6, line 12, please replace the word "interrupts" with the word "interrupt".

Claim 7, col. 6, line 19, please delete the word "first".

Claim 7, col. 6, line 24, please insert the word "routine" after the word "service".

Signed and Sealed this

Thirtieth Day of December, 1997

Attest:

Attesting Officer

BRUCE LEHMAN

Commissioner of Patents and Trademarks